United States Patent Office 2,750,562
Patented June 12, 1956

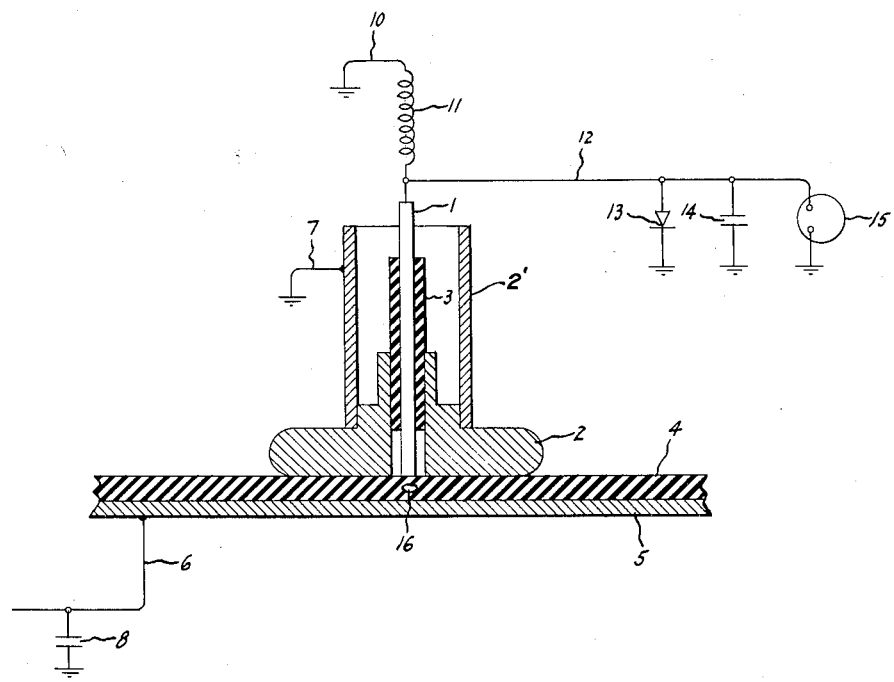
Inventor:
Wendell T. Starr,
by Paul A. Frank
His Attorney.

2,750,562

INSULATION FAULT DETECTOR

Wendell T. Starr, Schenectady, N. Y., assignor to General Electric Company, a corporation of New York Application September 16, 1952, Serial No. 309,886

4 Claims. (Cl. 324—54)

The present invention comprises an electric apparatus whereby imperfections in dielectric and insulating materials, such for example, as voids or conducting particles, may be detected without damage to the dielectric material or other parts of an apparatus containing the dielectric material.

An apparatus made in accordance with my invention comprises a compound electrode and an accompanying electrical means which is responsive to any such abnormal condition of dielectric material being subjected to examination. More specifically, the compound electrode in an apparatus embodying my invention consists of a probe electrode and a larger surrounding shielding electrode which is electrically insulated from the probe electrode. The electrical means forming a part of apparatus embodying my invention includes a capacitor and inductance elements connected to said probe electrode whereby damped transient oscillations are produced in the probe circuit when the probe encounters an imperfection, such as a void in the dielectric material undergoing examination. Means also is provided for suppressing or reducing undesired oscillations in the shielding electrode.

The accompanying drawing illustrates a shielded probe electrode and also illustrates diagrammatically circuit elements suitable for carrying out my invention.

The compound electrode shown in the drawing comprises a central rod-shaped probe electrode 1 and a surrounding larger guard or shielding electrode 2 of an annular disk shape, the edges of which are rounded to distribute potential stress. These electrodes may be insulated from one another by insulating material 3 or simply may be spaced apart. The faces of these electrodes are shaped to conform to the configuration of the surface of insulation being tested and commonly are in the same plane. Preferably, but not necessarily, a cylinder 2' mounted on the shield electrode 2 extends about the probe electrode 1 in spaced relation. When the dielectric condition of a unit of electric insulation is to be determined which is represented by the plate-shaped member 4, the probe electrode is placed in contact with the surface of 4, as indicated. Upon the opposite side of the insulating plate 4 is a conductive plate 5 which is connected by a conductor 6 to a source of voltage (not shown) which may be the secondary of a transformer fed from a source of adjustable voltage. Testing voltages up to 50 kv. have been used, but higher voltages may be used. The shield electrode 2 is connected to ground by a conductor 7. Connected to the conductor 6 is a capacitor 8 which is grounded as indicated.

The circuit including the shielding electrode 2, conductor 7, ground, conductor 6, and the conductive plate 5 (which with the electrode 2 forms a capacitor) is rendered insensitive to ionization in that part of the dielectric 4 subtended by the shield 2 by shunting the capacitance between the shielding electrode and conductive plate with the relatively large capacitor 8 which is free of ionization at the test voltage.

The probe electrode 1 is connected to ground by a conductor 10 containing an inductance coil 11. A resistance may be used in place of the inductance 11. The conductor 12 leads from the inductance coil to a grounded rectifier 13 and to a capacitor 14 which also is grounded.

When a probe electrode thus connected is passed over the surface of insulation 4 and encounters a fault or void buried in the insulation as indicated at 16, the voltage stress in the insulation will cause ionization in the fault or void which will set up a damped transient discharge in the inductance coil 11 which may be amplified and recorded or observed thus determining the quality of the insulator being examined. Various indicating means may be used for this purpose, such means being represented by a grounded rectifier 13 which charges the grounded capacitor 14. A grounded voltmeter 15 connected across or in shunt to the capacitor 14 will indicate voltage impulses set up in the capacitor. Various other more sensitive means will be obvious to those skilled in the art for indicating or recording such voltage impulses.

The surface of the insulation undergoing examination may be rendered semi-conducting so that the tangential stress along the surface of the material surrounding the test electrodes remains below the stress required for surface ionization. The device is insensitive to ionization in the area adjacent the shielding electrode due to the relatively large capacity of the capacitor 8 which shunts the shielding electrode.

It should be understood that the specific physical form of probe and shield electrodes illustrated and described herein is to be considered only as illustrative and that various changes in form and arrangement may be made by those skilled in the art of electrical instruments.

What I claim as new and desire to secure by Letters Patent of the United States is:

1. An insulation fault detector comprising the combination of a probe electrode, circuit means connected thereto responsive to ionization in localized regions of insulation under examination, an electrically insulated electrode positioned about said probe electrode to shield the periphery of said probe electrode from disturbing electric field effects, and capacitor electric means in circuit with said shielding electrode for minimizing undesired electric effects in said shielding electrode which would mask the effects of ionization due to internal defects in said insulation.

2. An instrument for detecting faults in electrical insulation comprising the combination of a probe electrode, a shield electrode of greater diameter surrounding said probe electrode and electrically insulated therefrom, the faces of said electrodes being substantially in the same plane and capacitor means for rendering said shield electrode insensitive to ionization in the area of insulation subtended by said shield electrode in the effective test position of said probe electrode.

3. An insulation fault detector comprising the combination of a rod-shaped probe electrode, a surrounding disk-shaped shield electrode having rounded edges and being shaped to conform to the surface of insulation to be tested, electrical insulation between said electrodes, electric means connected to said probe electrode adapted to generate oscillations in response to ionization in insulation being tested, and means in circuit with said shield electrode for minimizing therein oscillations which would lessen the sensitivity of said probe electrode.

4. An insulation fault detector comprising the combination of a rod-shaped probe electrode, a surrounding shield electrode having the form of an annular disk with a rounded outer edge, said electrodes each having a substantially flat surface in a common plane, electrical insulation between said electrodes, a conducting cylinder mounted upon said shield electrode and surrounding said rod-shaped electrode in spaced relation, electric means connected to said probe electrode responsive to generate oscillations upon ionization in insulation under examination by said probe electrode, and means in circuit with said shield electrode for minimizing therein disturbing oscillations which would mask the sensitivity of said probe electrode.

References Cited in the file of this patent

UNITED STATES PATENTS

| | | |
|---|---|---|
| 1,905,412 | Kasson | Apr. 25, 1933 |
| 2,076,944 | Howe | Apr. 13, 1937 |
| 2,087,783 | Savage | July 20, 1937 |

OTHER REFERENCES

Van Valkenburg: Abstract of application Serial No. 110,116, published January 1, 1952; 654 O. G. 323.

"Electrical Insulating Materials," by Monkhouse, published by Sir Isaac Pitman & Sons Ltd. (1926), page 304.

A. S. T. M. Standards on Electrical Insulating Materials, published by A. S. T. M. (1944), pp. 324–366, 369.